Nov. 28, 1967   RYUICHI SAGAWA   3,354,785
MECHANISM FOR MUTUAL CHANGE BETWEEN DIFFERENT TYPES
OF DISPLACEMENT AND AN AMPLIFIER OF FORCE OR TORQUE
Filed March 26, 1965

INVENTOR.
RYUICHI SAGAWA
BY
Milford A. Juten

United States Patent Office 3,354,785
Patented Nov. 28, 1967

1

3,354,785
MECHANISM FOR MUTUAL CHANGE BETWEEN DIFFERENT TYPES OF DISPLACEMENT AND AN AMPLIFIER OF FORCE OR TORQUE
Ryuichi Sagawa, Kohe, Japan, assignor to Kawasaki Jukogyo Kabushiki Kaisha, a corporation of Japan
Filed Mar. 26, 1965, Ser. No. 442,974
Claims priority, application Japan, Mar. 27, 1964, 39/16,874
4 Claims. (Cl. 91—49)

The present invention relates to servo motors and more particularly to a servo motor which will respond to a minimum force of movement on an input shaft member to produce corresponding movement with substantial force on an output shaft member.

Heretofore, various types of servo motors have been provided but none has been entirely satisfactory to produce the precise type of control required for electronic apparatus, particularly where the control forces are very small and therefore the motions produced by the very small forces are uncertain and the controls heretofore known have not been entirely satisfactory.

These problems have been particularly difficult, particularly where a motor coil has a very small linear or rotary force and the output for performing the control must necessarily have substantially greater power but the motion must be accurately controlled.

An object of the present invention is to provide a servo motor structure which overcomes the problems enumerated above.

Another object is to provide a position control for an output member from an input control member so that the movement of the output member will correspond precisely with the movement of the input member to thereby assure accurate control.

Another object is to provide a servo fluid operated motor which is responsive to both linear and angular displacement or combinations thereof.

Other and further objects will be apparent as the description proceeds and upon reference to the accompanying drawing wherein:

FIGURE 1 is an axial section through one form of the servo motor showing the input and output shafts in axial alignment and in elevation and showing the cylinder in section with the paddle-type pistons fixed to the output shaft and angularly moveable therewith and also showing one fluid supply passage and one fluid release passage for one chamber and showing the outlets of fluid release passages controlled by a helical plate slidably and rotatably mounted on the output shaft and controlled by the input shaft.

FIGURES 7 to 10, inclusive, are fragmentary sections

2 taken substantially on lines 7—7 to 10—10, respectively, showing the fluid release passages.

Figures 11, 12, 13:
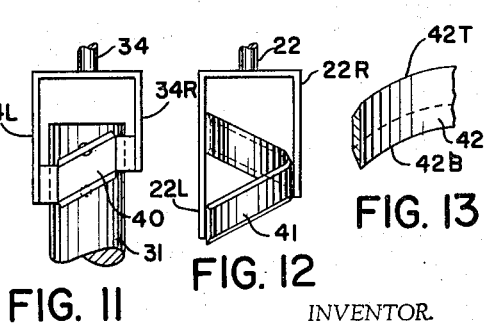

FIGURE 11 is a fragmentary elevation of a portion of the input and output shafts with a small angular dimension helical control plate.

FIGURE 12 is an elevation of the input shaft with a helical control plate of 360° length.

FIGURE 13 is a fragmentary view showing a sectional and elevational portion of the helical plate as viewed from the inner surface.

Various devices have hitherto been advocated in regard to the directly connected position feedback amplifier of force or torque, in which mutual types of displacement of input and output signals, with fluid pressure as a medium, correspond with each other with the proportion of one to one in the types of displacement of the same kind such as linear displacement to linear displacement or angular displacement to angular displacement. In the operative elements of the automatic control system, as, for instance, in the servo-valve or in the servo-actuator, there arise many cases where it is necessary to drive with a motor coil which can generate only a slight linear force a rotary actuator with a great load, or to drive a linear actuator or valve with a motor armature which can generate only a slight torque. Or as in the feedback elements, many cases arise where the linear or the rotary displacement is required without imposing a load on the input shaft. The final displacement to be reproduced may be rotary or linear motion with the amplified torque or force produced by this system. The automatic control system, especially in the electrohydraulic servo control system, is most useful to amplify the torque or force, performing the mutual displacement change between such different types of motions as the linear and the rotary motion. The present invention provides mechanism in which a mutual quantitative relation, i.e., a displacement with proportional gain can arbitrarily be chosen in the directly connected position feedback amplifier whose types of displacement differ as much from each other as a linear displacement from an angular displacement.

Referring particularly to FIGURES 1 to 5, inclusive, the servo motor of the present invention includes a supporting structure 15 of cylindrical shape in which an output shaft 16 is rotatably mounted and fixed on said shaft is a paddle 17 which snugly engages the circumferential wall and the top and bottom walls of the cylinder 15 while a stationary vane or wall 18 extends radially inward from the circumferential wall of the cylinder to the output shaft 16 and snugly engages the output shaft, thereby providing separated chambers 19 and 20, and the sizes of such chambers may vary due to the angular movement of the shaft 16 and the paddle 17.

A supply of fluid under pressure is provided through a conduit 21 which has two passages, one of which goes to a fixed throttle orifice 21A and thence opens into the chamber 20; while another branch of the supply conduit 21 extends to a second fixed orifice 21B opening into the second chamber 19, whereby fluid pressure is carried to the chambers on both sides of the paddle pistons 17. When the pressure is uniform, the paddle pistons 17 remains stationary.

A second pair of passages A and B provide for release of the pressure from chambers 20 and 19, respectively, and passage A includes a generally radially extending bore A1 and an axially extending bore A2 with a second radially extending bore A3 providing communication to the outer periphery of the output shaft 16. Similarly, the second pressure release passage B includes a radially extending passage B1, a vertically extending passage B2 and a radially extending outlet B3 providing for pressure release from the chamber 19.

Mounted on the shaft 16 is an input shaft 22 having yoke arms 22L and 22R carrying a helically shaped control plate 23 with such helically shaped control plate having a lower and upper knife edge with the spacing of such knife edges along the axis of the shaft 16 being such that the knife edges at least partially close the passages A3 and B3, whereby a small amount of fluid may pass out of such passages. The shaft 22 with the yoke and the helical plate 23 is mounted to maintain the plate in effective contact with the shaft 16 to perform this function of partially closing the outlet passages A3 and B3 by suitable means not shown, such as a sleeve or the like.

From the above description, it is believed that the operation should be clear since the input shaft 22 may be moved axially with a very small force, thereby covering one of the outlets B3 or A3 and permitting the fluid pressure to escape through the uncovered outlet so that the paddle 17 moves in the direction of the passage having the uncovered outlet, thereby moving the uncovered outlet angularly toward the adjacent knife edge of the helical plate 23 until the outlet is at least partially covered by the knife edge and the other outlet is partially opened to the exterior of the shaft 16 until stable conditions occur in which the pressure is the same on both sides of the paddle piston 17 and the shaft 16 then comes to rest in the desired position with respect to the input shaft 22. The displacement function can also be accomplished by axially moving the shaft 22 and thereby uncovering one of the outlet passages causing rotation of the paddle 17 and of the output shaft 16 in the corresponding direction. Consequently the present invention provides for linear and angular adjustment and control and the precise amount of control can be determined by the diagram shown in FIGURE 5 where the height H corresponds to the axial difference between one extremity and the other of one knife edge of the plate 23 and the angle ⒷⒷ corresponds to the angle of rotation of the output shaft 16 and the angle $\alpha$ corresponds to the angular length of the helical plate 23. The radius $r$ is the radius of the shaft 16 and the distance $x$ is the axial displacement of the shaft 22.

This relation is mathematically Ⓑ$=\alpha x/H$.

Upon reference to FIGURES 6 to 13, inclusive, a modification of the invention is shown in which similar parts are identified by the same reference numerals to avoid duplication of description, but the cylinder 30 has a cylindrical bore with the shaft 31 being mounted for reciprocating movement and carries a piston 32 fixed thereon and such piston and shaft 31 are prevented from rotation relative to the cylinder 30 by a pin 33 which extends into a bore extending axially in the piston to permit reciprocation of the piston while preventing rotation thereof with respect to the cylinder 30. The piston 32 divides the cylinder into chambers 19 and 20 which are supplied with fluid from a common supply 21 through fixed orifices 21B and 21A in the manner previously described. The pair of pressure release passages are identified by the reference numerals A1, A2, and A3 for the chamber 20 and the reference numerals B1, B2 and B3 for the chamber 19 and the control plate 23 is supported on the control input shaft 34 having a yoke including a left arm 34L and a right arm 34R, with a helical plate 35 having an upper knife edge and a lower knife edge with such knife edges being arranged in a helix but of opposite hand to that shown in FIGURE 1. It will be apparent that the arrangement of the pressure releasing passages with respect to the knife edges of the helical plate can be arranged in a number of combinations of which two different combinations are shown, but by suitable design the desired control characteristics can be accomplished and a detailed analysis thereof appears to be unnecessary.

Figure 6:
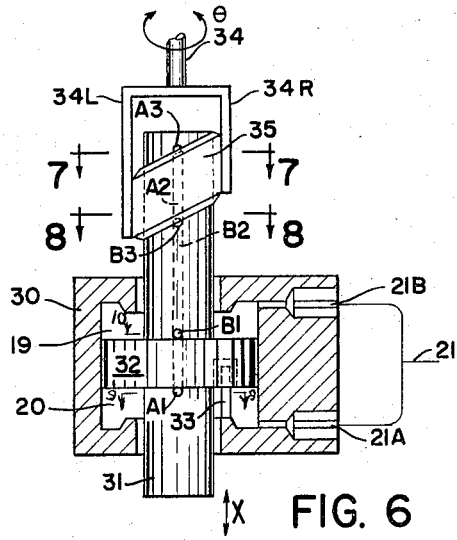
FIGURE 6 is an axial section similar to FIGURE 1 of a modification of the invention using a cylindrical piston movable in an axial direction.
Figure 5:
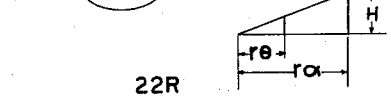
FIGURE 5 is a diagrammatic circumferential development view of the relation between the knife edges of the helical plate and the peripheral outlet opening in the pressure release passages whereby the linear and angular movements of the input shaft will perform the necessary controlling function to operate the output shaft from the piston.
Figures 3, 7, 8:
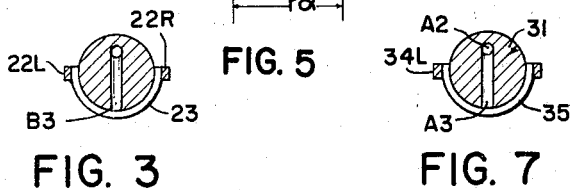
FIGURE 3 is a horizontal section taken on line 3—3 of FIGURE 1.
Figure 4:
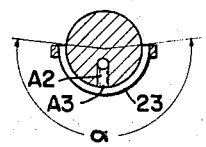
FIGURE 4 is a section taken on line 4—4 of FIGURE 1 with FIGURES 3 and 4 showing the pressure release passages for the two chambers.
Figure 9:
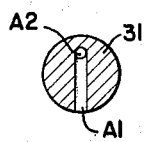
Figure 10:
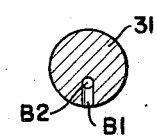
Figure 2:
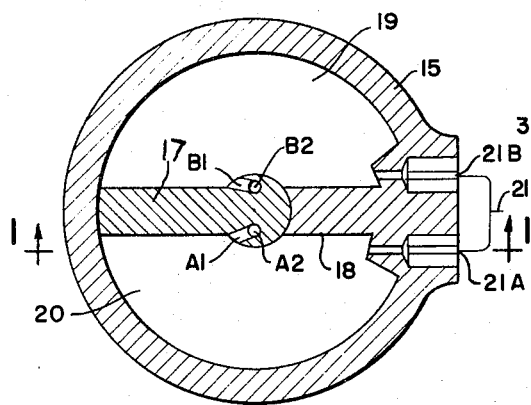
FIGURE 2 is a section taken on the line 2—2 of FIGURE 1 showing the two chambers and the two fluid supply passages.

The illustrations of FIGURES 11 and 12 are numbered similarly to FIGURE 6 but the helical plates are of a different size and therefore the short helical plate of FIGURE 11 is identified 40 and the 360° helical plate of FIGURE 12 is identified 41. It will be apparent that the helical plates may have a small angular extent, as in FIGURE 11, an angular extent of 180° as shown in FIGURES 1 and 6, or an angular extent of 360° as shown in FIGURE 12, or the angular extent may cover more than 360° and any variations therebetween, such as that shown in FIGURE 4.

The showing in FIGURE 13 includes a fragment of a helical plate 42 in which a sectional end thereof shows the knife edges 42T and 42B at the top and bottom, respectively, thereof.

Although the cylinders are shown as of single piece construction, it will be apparent that this showing is diagrammatic and for simplicity, but the actual structure would be made in sufficient parts to permit assembly and disassembly.

Figure 1:
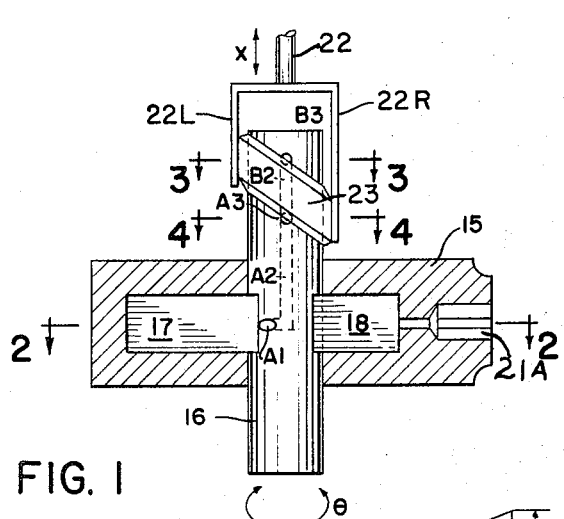

It will thus be seen that applicant has thus provided an effective servo control which accomplishes the result of accurate power control with a minimum of force applied on an input shaft and any desired force produced on an output shaft with a balanced condition being accomplished by the partial closure of each of the pressure releasing passages so that equal pressure will be maintained on both sides of the piston, whether the piston is the paddle of FIGURE 1 or the piston of FIGURE 6.

It will be apparent that changes in the precise construction can be made within the scope of the invention as defined by the valid scope of the claims.

What is claimed is:

1. A servo motor for producing forceful motion on an output shaft by a minimum force applied to an input shaft comprising a closed cylinder, a snugly fitting piston mounted in said cylinder and providing with said cylinder a pair of chambers, means to maintain said piston against movement in one of an axial movement or a rotary movement while the piston is free to move in the other of an axial movement or a rotary movement, an output shaft connected to said piston, a first pair of independent passage means, one of said first pair of passage means providing a supply of fluid pressure to one chamber, the other of said first pair of passage means providing a supply of fluid pressure to the other chamber, a second pair of independent passage means, one of said second pair of passage means providing for release of fluid pressure from one chamber, the other of said second pair of fluid pressure passage means providing for release of pressure from the other chamber, said second pair of passage means opening to the periphery of said output shaft with their open ends in spaced relation, an input shaft mounted for movement in one of an axial movement or a rotary movement and in axial alignment with said output shaft, a plate mounted on said input shaft closely adjacent said output shaft, the edges of said plate extending at an acute angle to the axis of the output shaft, the edges of said plate being spaced apart a distance less than the distance between the most distant portions of the open ends of said second pair of passage means, said edges being spaced apart a distance greater than the distance between the closest portions of the second passage means, whereby movement of the input shaft in one of the axial or rotary movements will cause the second passage means to be partially closed by the plate and thereby control the flow of fluid from the chambers thereby controlling the differential pressure between both chambers continuously and linearly according to the amount of relative displacements between the plate and the output shaft to cause the motion of the piston and the output shaft in the other direction of said an axial movement and a rotary movement whereby a minimum control force on said input shaft will be changed to a substantial force on said output shaft corresponding to the control movement of said input shaft.

2. The invention according to claim 1 in which the plate is helical and the ends of the second pair of passage means opening on the periphery of the output shaft are spaced axially.

3. The invention according to claim 1 in which the cylinder and piston have a common axis and the piston reciprocates on said common axis.

4. The invention according to claim 1 in which the piston is a wall mounted for swinging movement about the axis of the output shaft.

References Cited

UNITED STATES PATENTS

| | | | |
|---|---|---|---|
| 2,813,519 | 11/1957 | Persson | 91—49 |
| 2,974,646 | 3/1961 | Miller et al. | 92—166 |
| 2,992,633 | 7/1961 | Stiglie | 91—49 |
| 3,115,066 | 12/1963 | Firth et al. | 251—205 |

FOREIGN PATENTS

| | | |
|---|---|---|
| 795,892 | 6/1958 | England. |
| 76,333 | 12/1959 | France. |
| 424,127 | 3/1911 | France. |
| 1,088,288 | 3/1955 | France. |

MARTIN P. SCHWADRON, *Primary Examiner.*

P. T. COBRIN, B. L. ADAMS, *Assistant Examiners.*